United States Patent
Kline et al.

(10) Patent No.: US 10,165,326 B1
(45) Date of Patent: *Dec. 25, 2018

(54) TECHNOLOGICAL FACILITATION OF VIRTUAL IN-VENUE EXPERIENCE FOR REMOTE SPECTATOR(S) OF AN EVENT

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,310

(22) Filed: May 31, 2017

(51) Int. Cl.
| | |
|---|---|
| *H04N 21/462* | (2011.01) |
| *H04N 21/81* | (2011.01) |
| *H04N 21/218* | (2011.01) |
| *H04N 21/44* | (2011.01) |
| *H04N 21/439* | (2011.01) |
| *H04N 21/41* | (2011.01) |

(52) U.S. Cl.
CPC ... *H04N 21/4622* (2013.01); *H04N 21/21805* (2013.01); *H04N 21/4122* (2013.01); *H04N 21/439* (2013.01); *H04N 21/44* (2013.01); *H04N 21/816* (2013.01)

(58) Field of Classification Search
CPC ......... H04N 21/4622; H04N 21/21805; H04N 21/4122; H04N 21/439; H04N 21/44; H04N 21/816
See application file for complete search history.

(56) References Cited

U.S. PATENT DOCUMENTS

| | | |
|---|---|---|
| 8,576,276 B2 | 11/2013 | Bar-Zeev et al. |
| 9,268,138 B2 | 2/2016 | Shimizu et al. |

(Continued)

OTHER PUBLICATIONS

Kline et al., "Technological Facilitation of Virtual In-Venue Experience for Remote Spectator(s) of an Event", U.S. Appl. No. 15/823,740, filed Nov. 28, 2017 (42 pages).

(Continued)

*Primary Examiner* — John Schnurr
(74) *Attorney, Agent, or Firm* — Tihon Poltavets, Esq.; Kevin P. Radigan, Esq.; Heslin Rothenberg Farley & Mesiti P.C.

(57) ABSTRACT

A virtual in-venue experience is provided to a remote spectator receiving one or more sets of audio visual (AV) feeds of an event, a set of the feeds including a primary and one or more secondary AV feeds. The secondary AV feed(s) provides supplemental content to the main content provided by the primary AV feed, and includes peripheral field of view audio visual content for the set. The set of feeds may be captured from a respective location within the venue. The primary audio visual feed is displayed for view by the remote spectator, and in association with display of the primary feed, the secondary audio visual feed(s) is displayed in a peripheral field of view of the remote spectator. The secondary AV feed(s) provides the remote user with peripheral AV content at the respective location within the venue, thereby enhancing the in-venue experience for the remote spectator.

14 Claims, 11 Drawing Sheets

(56) References Cited

U.S. PATENT DOCUMENTS

| | | | |
|---|---|---|---|
| 9,268,406 B2 | 2/2016 | Geisner et al. | |
| 9,396,588 B1 | 7/2016 | Li | |
| 2004/0003409 A1* | 1/2004 | Berstis | H04N 5/23206 725/105 |
| 2014/0013228 A1* | 1/2014 | Hutten | G06F 3/048 715/720 |
| 2017/0287220 A1* | 10/2017 | Khalid | G06T 19/006 |

OTHER PUBLICATIONS

Kline et al., "List of IBM Patents and/or Patent Applications Treated as Related", dated Nov. 28, 2017 (2 pages).
Hixon, Emily, "Using Video-Based Cases to Create a Virtual Field Experience", 19th Annual Conference on Distance Teaching and Learning, 2005 (pp. 1-6).
Mel, et al., "The NIST Definition of Cloud Computing," National Institute of Standards and Technology, Information Technology Laboratory, Special Publication 800-145, Sep. 2011, (pp. 1-7).
International Business Machines Corporation (IBM), "z/Architecture Principles of Operation," IBM® Publication No. SA22-7832-10, Eleventh Edition, Mar. 2015, (pp. 1-1732).
International Business Machines Corporation (IBM), "Power ISA™ Version 2.07B," International Business Machines Corporation, Apr. 9, 2015, (pp. 1-1527).
Anonymous, "Field Viewer and Remote Viewer Experience Synchronization", IPCOM000242050D, Jun. 16, 2015 (4 pages).
Anonymous, "Method and System for Eye Direction Based Video Layer Change", IPCOM000246658D, Jun. 24, 2016 (4 pages).
Xi, et al., "Simultaneous Mutual Sharing in a Virtual Meeting Environment", IPCOM000247045D, Jul. 29, 2016 (9 pages).

* cited by examiner

TECHNOLOGICAL FACILITATION OF VIRTUAL IN-VENUE EXPERIENCE FOR REMOTE SPECTATOR(S) OF AN EVENT

BACKGROUND

Watching an event remotely on television is a different experience from viewing the event in person at the venue. An aspect of this is that the remote spectator does not view or feel the experience from the in-venue spectator's field of view. In particular, a person watching an event within a venue may often experience the event in a significantly different way than a person watching on television. For instance, an in-venue spectator experiences the event along with other spectators within the venue at their location, but the remote viewer or spectator of the event, for instance, watching on a television, is not conventionally able to experience the event in the same context or to the same extent. Further, a remote spectator may desire viewing an event with more control over the point of view from which to watch the event, for instance, by choosing to view the event from the home team's fan section or the visiting team's fan section.

SUMMARY

Certain shortcomings of the prior art are overcome and additional advantages are provided through, in one or more aspects, the provision of a method of facilitating a virtual in-venue experience for a remote spectator of an event. The method includes receiving one or more sets of audio visual feeds of the event. A set of audio visual feeds of the one or more sets of audio visual feeds includes a primary audio visual feed and one or more secondary audio visual feeds. The primary audio visual feed of the set includes main audio visual content for that set and the secondary audio visual feed(s) includes secondary audio visual content of the event, supplemental to the main audio visual content, from a respective location within a venue hosting the event, and including peripheral field of view audio visual content supplemental for that set. Each set of audio visual feed is captured, at least in part, from a different respective location within the venue. The method further includes displaying the primary audio visual feed of the set of audio visual feeds for viewing by a remote spectator, and also displaying in association therewith, at least in part, the secondary audio visual feed(s) of the set in the peripheral field of view of the remote spectator. The secondary audio visual feed(s) provides the remote spectator with peripheral audio content at the respective location supplemental to the main audio visual content, thereby facilitating the in-venue experience for the remote spectator.

Systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, communication techniques, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for facilitating providing a remote spectator with an in-venue experience.

Figure 1:
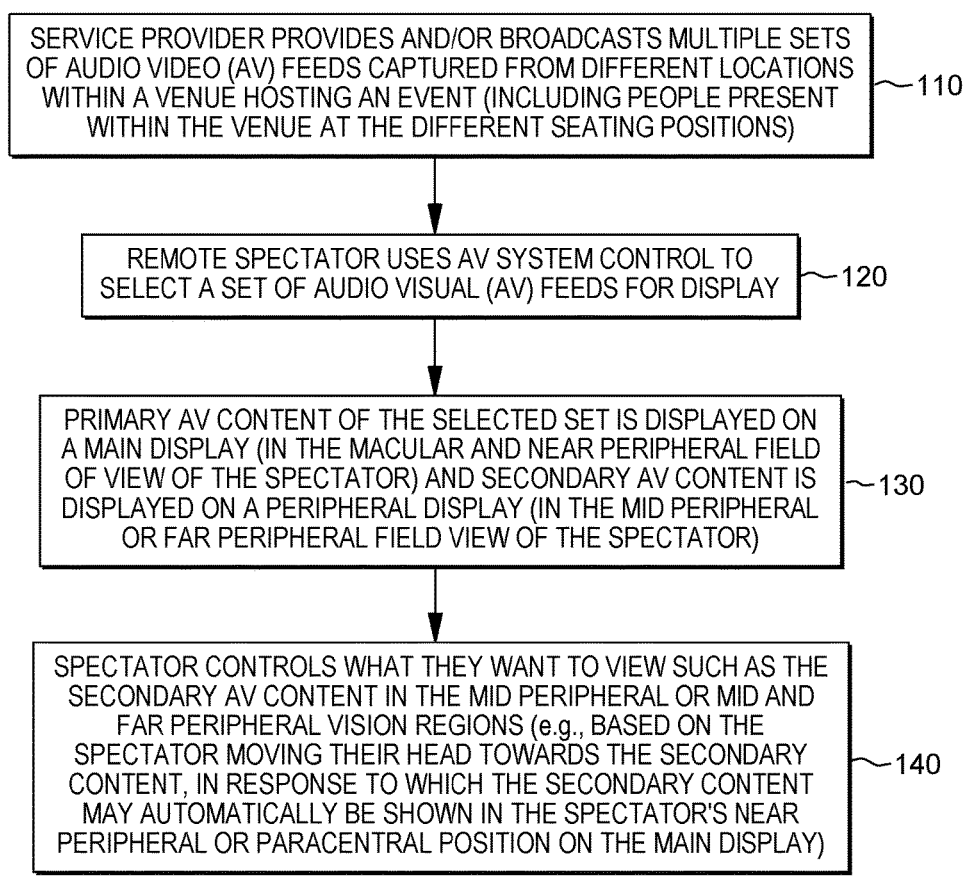
FIG. 1 depicts one embodiment of a method of facilitating an in-venue experience for a remote spectator of an event, in accordance with one or more aspects of the present invention.

By way of example only, FIG. 1 depicts one embodiment of a method 100 of facilitating an in-venue experience for a remote spectator. As illustrated, method 100 includes a service provider providing and/or broadcasting one or more sets of audio visual (AV) feeds (e.g., digitized AV feeds) from different respective locations within the venue hosting an event 110. In one or more embodiments, a set of AV feeds may include a primary AV feed containing main audio visual content of the event from the respective location within the venue and one or more secondary AV feeds which may include, in part, secondary audio visual content supplemental to the main audio visual content for the set from the respective venue location. Note in this regard that although referred to herein as audio visual feeds and audio visual content, one or more of the feeds may comprise, for instance, video feeds only and/or audio feeds only. For instance, one or more of the sets of audio visual feeds may include an audio dedicated feed, and one or more dedicated visual feeds. Alternatively, each audio visual feed or layer may include both audio and visual content depending on the implementation. Also note that the secondary AV feed(s) may be dependent (or synchronized) to the primary AV feed, or independent (or asynchronous to) the primary AV feed. In one example, the service provider may provide multiple sets of AV feeds captured from different locations within the venue, and each set may include one or more secondary AV feeds, such as audio visual content including the people present at the venue during the event and within the peripheral field of view of the audio visual apparatus capturing the AV feeds at the respective location. More particularly, in one or more implementations, the primary AV feed of a set of feeds may contain the main AV content of the event at the respective location within the venue, while the secondary AV feed(s) may contain AV content which includes people within the venue at the respective location within peripheral view of the audio visual apparatus capturing the feeds. In one or more embodiments, the secondary AV feed(s) may be dependent on the primary AV feed such that the scale and perspective of the secondary AV content is governed by the scale and perspective of the primary AV feed. This additional AV content is captured in order to allow the remote spectator to be more immersed within the crowd at the event, creating a more life like, virtual in-venue experience for the remote spectator. Note that as used herein, the phrase "remote spectator" means a spectator external to the venue hosting the event, and may either be a spectator viewing the event live, or a spectator viewing a previously recorded event. The spectator is the user of the audio visual content being provided and displayed as described herein.

In one or more embodiments, the remote spectator selects a set of AV feeds for display 120. For instance, in the case where there are multiple sets of AV feeds, the user may select a particular set captured from a desired location within the venue from which to watch the event. Based on the selection, the primary AV content of the selected set may be displayed, for instance, for viewing in the paracentral, macular and/or near peripheral field of view of the remote spectator (collectively referred to herein as the main field of view of the spectator), and the secondary AV feed(s) may be displayed, for instance, in the peripheral field of vision of the remote spectator, such as the viewer's mid-peripheral or far-peripheral field of vision 130 (collectively referred to herein as the peripheral field of view of the spectator). Further, in one or more embodiments, the remote spectator may control where in the peripheral field of view the secondary AV content is displayed, for instance, in the mid-peripheral or in both the mid-peripheral and far-peripheral vision regions 140, for instance, by selection of a particular secondary AV feed of multiple secondary AV feeds in the selected set of AV feeds. In one or more embodiments described herein, the remote spectator may also control the display of AV content by, for instance, moving their head towards the secondary content, in response to which the secondary content may automatically be shown within or closer to the spectator's main field of view (e.g., the near-peripheral or paracentral field of view), such as in the case where the secondary content has been modeled and rendered as discussed below.

Advantageously, methods, systems and computer program products are disclosed herein which allow a remote spectator to receive, for instance, multiple sets of audio visual feeds of an event, each including a primary (or main) audio visual feed (or content), as well as one or more secondary audio visual feeds containing, for instance, further content on the spectators present in the venue at a respective location from which that particular set of AV feeds was or is being captured. Note in this regard that the event may be any event within any venue, either indoor or outdoor, such as a stadium, theater, arena, hall, conference room, etc. Note also that the event may be a live event or a recorded event. In implementation, the remote spectator may select a location within the venue based on the sets of AV feeds provided from which to view the event, with the appropriate secondary broadcast content from that location also being delivered to the remote spectator for display, for instance, on a personal audio visual (AV) apparatus worn by the spectator, such as a head mounted display device, or to an AV control system, for instance, for holographic imaging, as discussed further herein.

In one or more implementations, based on the remote spectator's position in front of a main display, such as a television screen or computer display screen, the personal AV apparatus worn by the spectator may identify the relative position of the main display with respect to the user's field of view. Additionally, the main audio visual content of the primary audio visual feed may be displayed on the main display, and the secondary broadcasted content supplemental to the main audio visual feed, may be displayed on a peripheral display of the personal AV apparatus worn by the spectator, in the peripheral field of view of the spectator, such as in the mid-peripheral or far-peripheral field of view of the remote spectator. In one or more other implementations, the personal AV apparatus worn by the remote spectator may include both the main display and the peripheral display, and may be, in one or more embodiments, head worn goggles similar to virtual reality googles, only with a peripheral display in combination with a main display for use as described herein. In such implementations, the main display of the apparatus may show the primary AV content, while the peripheral display may show, at least in part, the secondary AV content from the respective location within the venue. The spectator can also control, the extent to which the spectator wishes to view the secondary content, such in the mid-peripheral field of view, or in both the mid and far-peripheral field of view. For instance, should the spectator move their head towards the secondary content, the secondary content can automatically be shown, for instance, on the main display, in the user's peripheral or paracentral field of view, as described further below.

Figure 2A:
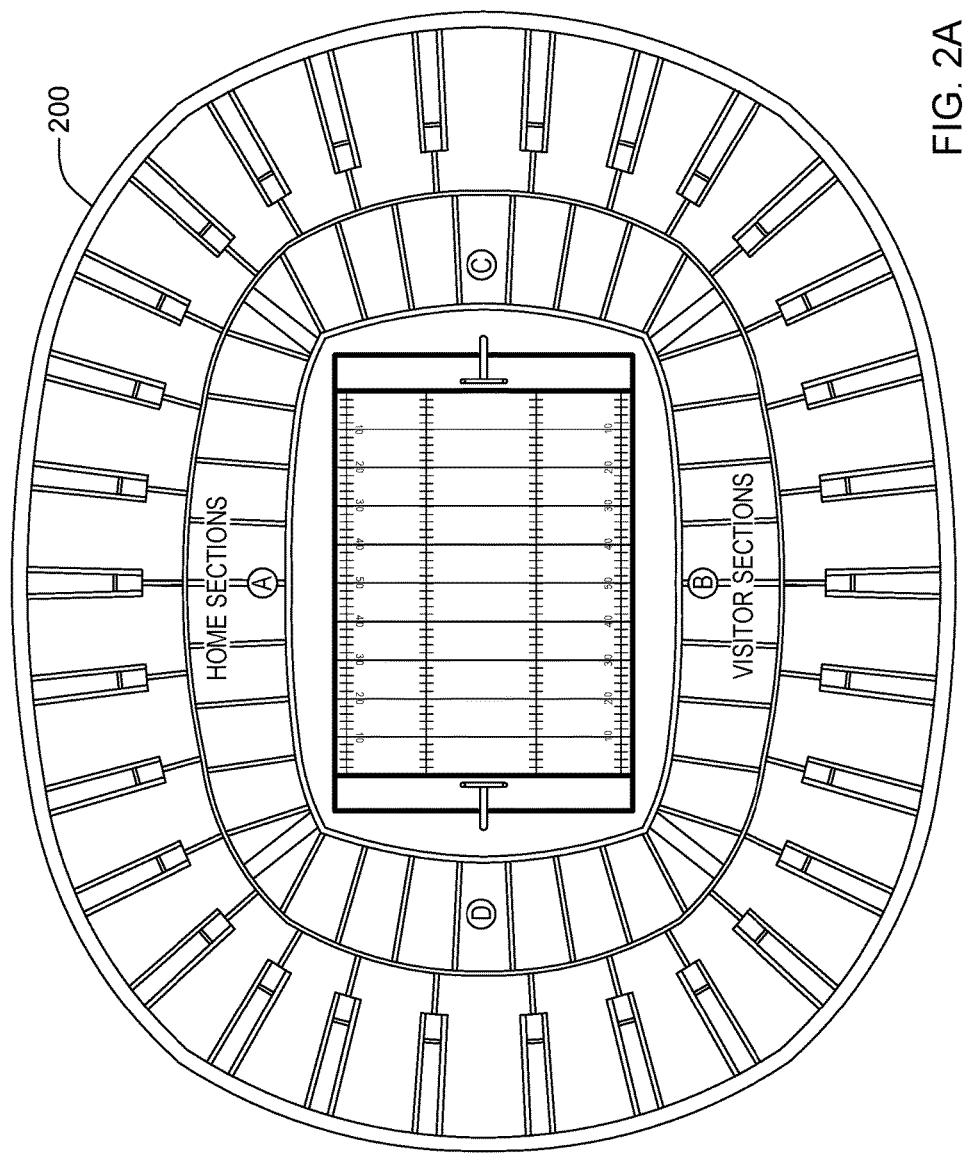
FIG. 2A depicts one embodiment of a venue which hosts an event, and showing examples of different respective locations within the venue where sets of audio visual feeds may be captured, in accordance with one or more aspects of the present invention.

FIG. 2A depicts one embodiment of a venue 200, which in this example shown as a stadium, at which an event (such as a sporting event) is occurring or has occurred and been recorded. (As noted, the event may either be a live event or a previously recorded event.) As explained, the venue may be any of a variety of event spaces such as arenas, stadiums, theaters, or other indoor or outdoor spaces where an event of interest is attended by people and broadcast to remote individuals, subscribers, etc., referred to herein as remote spectators, where remote denotes that the spectator is not within the venue hosting the event, that is, is external to the venue.

Figure 2B:
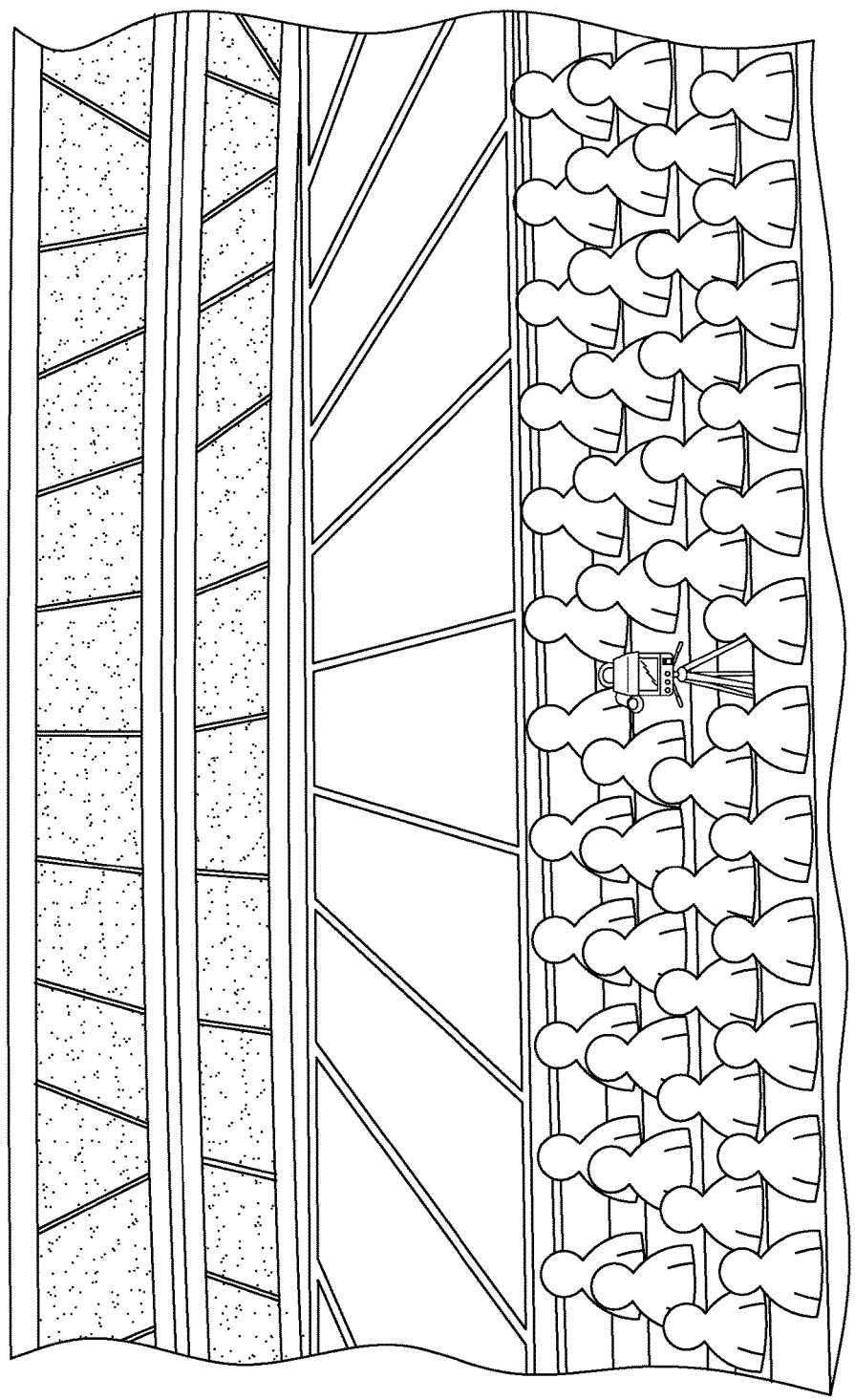
FIG. 2B depicts an example of an audio visual apparatus at a location within a venue which captures main audio visual (AV) content of the event and/or secondary AV content of the people at the location within the venue for broadcast to remote spectators, in accordance with one or more aspects of the present invention.

As illustrated in FIG. 2A, a service provider or broadcaster may provide multiple sets of audio visual feeds captured from different respective locations within the venue, with four different locations A-D being depicted, by way of example only. In one or more other embodiments, more or less sets of audio visual feeds, such as only one set of audio visual feeds, could be generated for broadcast to the remote spectators. As shown in FIG. 2B, in one or more embodiments, one or more sets of audio visual apparatus or equipment may be positioned in among the actual, in-venue spectators in different sections of the venue, and the AV equipment may be used to generate the respective sets of audio visual feeds discussed herein, which as noted, may include a primary audio visual feed and one or more secondary audio visual feeds.

For instance, in one or more implementations, when an audio visual set or file is to be created, primary or main audio visual content may be stored in a primary video layer, and one or more remaining secondary audio visual feeds may be stored in one or more secondary layers. The content in the primary layer will automatically be shown in the main screen of the remote spectator, and the secondary content may be displayed, for instance, in the mid or mid- and far-peripheral vision of the spectator using, for instance, a personal AV apparatus worn by the remote spectator, such as described herein.

As noted, the secondary audio visual feed(s) may be dependent on the primary audio visual feed, or may even be independent from the primary audio visual feed. In this context, dependent means that the secondary audio visual feed(s) is synchronized with the primary audio visual feed, while independent means that it may be asynchronous to the primary audio visual feed, but in either case, it may be generated from the respective location within the venue. By generating multiple sets of AV feeds within the venue, each at a different respective location, the remote spectator is able to select a particular set of AV feeds from which to view the event. As depicted in FIG. 2A, location A may be in the home team section(s), and location B may be in the visitor section(s), and so, depending on the preference of the remote spectator, the spectator may choose to view the event immersed within the home team fans or the visitor team fans, and thus experience the reactions and sounds from the surrounding selected fans. Alternatively, the remote spectator may have a preference for viewing the event from a different location within the venue, such as at an end zone section in the case of a sporting event. In other examples, the remote spectator may decide to view the event with spectators closer to where the event is occurring, or further back from where the event is occurring within the venue. This would allow the remote spectator to experience the event from multiple different perspectives dependent, in part, on the people who are present at the event within the venue at those locations, and as experienced, at least in part, through the secondary audio visual feed(s) of the selected set of AV feeds.

Figure 3:
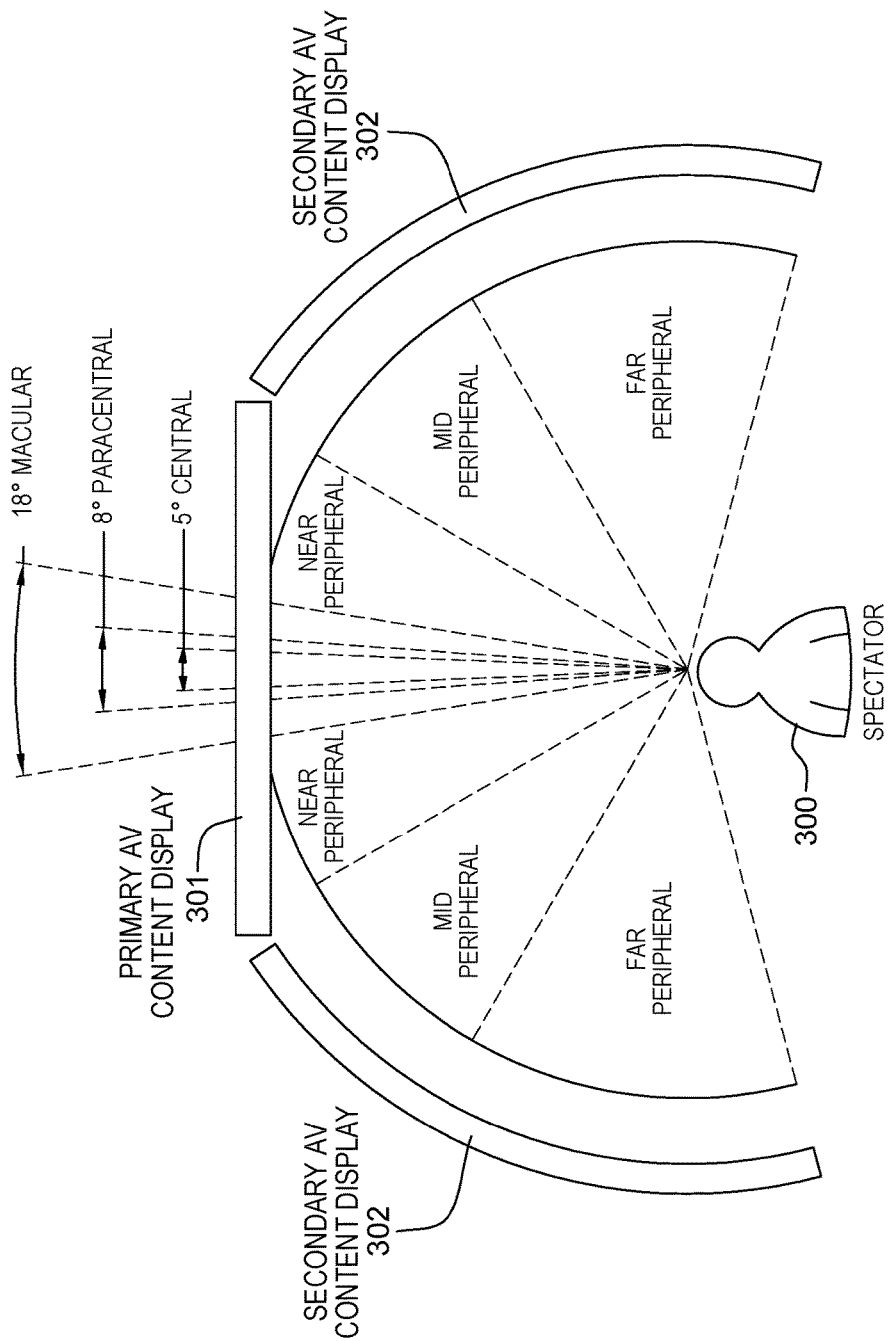
FIG. 3 depicts one embodiment of displaying a set of audio visual feeds on a primary AV content display and a secondary AV content display, in accordance with one or more aspects of the present invention.

FIG. 3 illustrates of operation of one or more aspects of facilitating an in-venue experience for a remote spectator, in accordance with the present invention. A spectator 300 is shown viewing an event using a primary AV content display 301 and a secondary AV content display 302, which may be the same or different displays, as described herein. In one or more implementations, primary AV content display 301 receives a primary AV feed from a set of AV feeds, and secondary AV content display 302 receives a secondary AV content feed(s) from the set of AV feeds. As depicted in FIG. 3, the remote spectator 300 views the primary AV feed video content on the primary AV content display 301 and experiences the secondary AV feed in one or more of the spectator's mid-peripheral or mid- and far-peripheral fields of view on the secondary AV content display 302. The secondary AV feed(s) may include, in one or more implementations, broadcasted content that is captured from a particular location (e.g., a particular seat within the venue) among the spectators present within the venue so that the remote spectator can virtually experience the event from this position, within the venue along with the actual spectators present at the venue at that location. In one or more implementations, the audio visual apparatus capturing the set of AV feeds at a particular location may be configured to essentially reside within the space of a single spectator at that location. This will allow the set of AV feeds to provide the remote spectator with a greater in-venue experience and result in a more life like in-venue experience for the remote spectator, since the remote spectator is able to actually view the event from a particular location within the venue, as well as listen to audio content at that location, as if the remote spectator was present within the venue at that location. Note that in one or more embodiments, the primary AV feed may be focused towards the event occurring within the venue, while the secondary AV feed(s) for a particular set of AV feeds may be focused, at least in part, towards the individuals within the venue at that location watching the event within the venue, that is, within the peripheral field of view of the audio visual equipment capturing the feeds. In one or more implementations, the secondary AV feed(s) could be obtained using a 360° (or panoramic) audio visual camera to more completely capture the spectators present at the venue.

Figure 4:
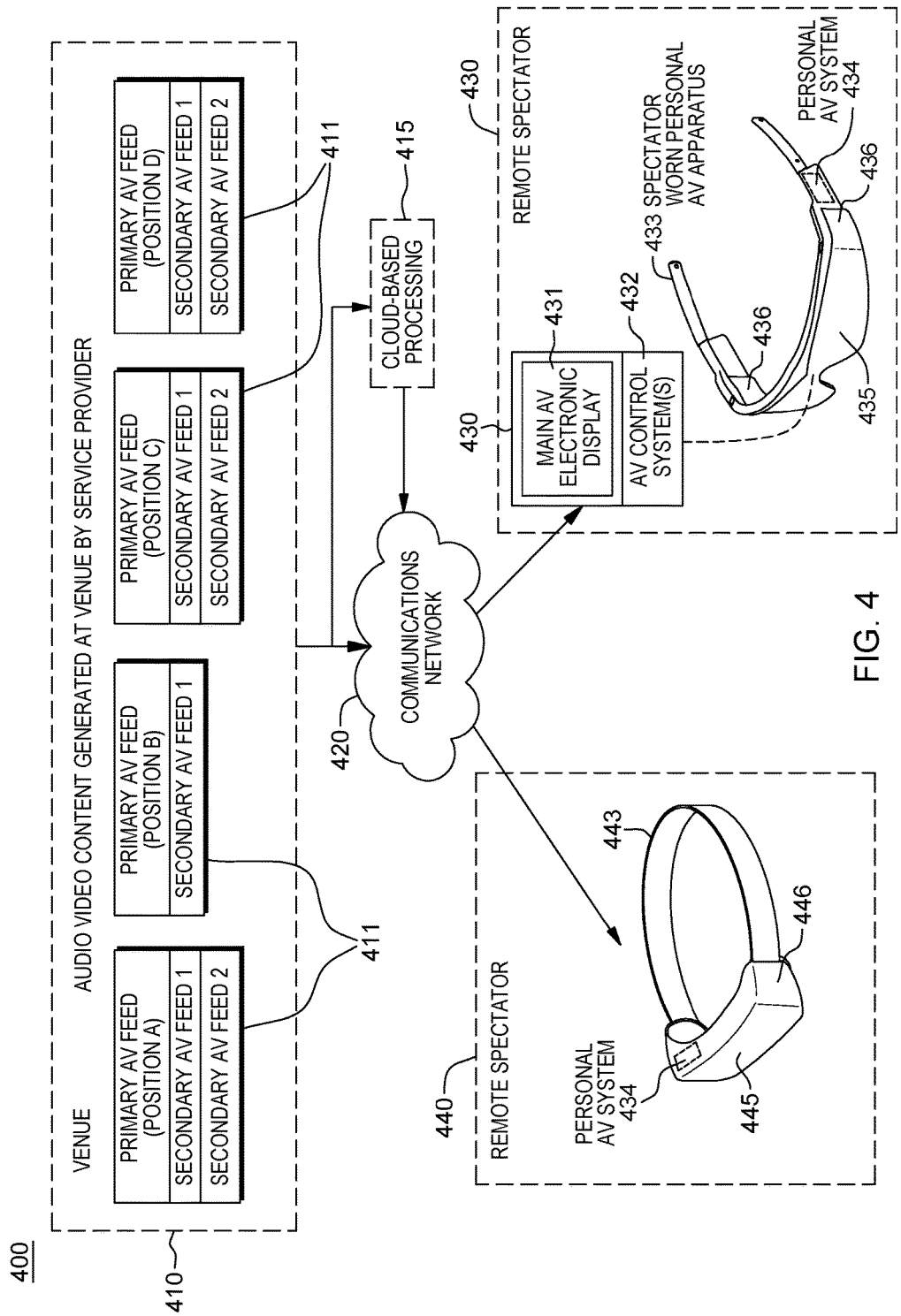
FIG. 4 depicts one embodiment of a system and process of facilitating an in-venue experience for remote spectators, where multiple sets of audio visual feeds are provided, for selection for display, at least in part, on respective personal audio visual apparatuses worn by the remote spectators, in accordance with one or more aspects of the present invention.

FIG. 4 depicts one embodiment of a system and process of facilitating an in-venue experience for remote spectators. As illustrated, the system, generally denoted 400, includes a service provider generating multiple sets 411 of audio video content (in one example) at a venue 410 hosting an event. In this case, four sets 411 of audio visual feeds are illustrated captured, for instance, at four distinct locations within the venue, such as illustrated in FIG. 2A. Further, each set of AV feeds is shown to include a primary AV feed from the respective location, as well as one or more secondary AV feeds. Note that the number of secondary AV feeds may be the same or different between sets. In one or more implementations, the primary AV feed is a primary audio visual layer of a set 411 of AV signals produced, and the secondary AV feed(s) is one or more secondary audio visual layers of the set of signals produced. The sets of AV feeds 411 may be available to remote spectators 430, 440 across a communications network 420. In one or more implementations, the sets 411 of AV feeds could be broadcast to the remote spectators, while in one or more other implementations, the remote spectators could access the feeds via cloud-based processing or storage 415, such as for instance, where the event is a recorded event.

As explained herein, there are a number of technological approaches to displaying the secondary AV feed or secondary audio visual content in the peripheral field of view of a remote spectator. Remote spectator 430 in FIG. 4 is shown to use a separate, main audio visual electronic display 431, with an associated AV control system(s) 432, as well as a user worn personal AV apparatus 433. In this case, the primary AV feed for the selected set of AV feeds may be displayed in the main AV display 431 (such as a television), and the secondary AV feed may be displayed in the peripheral field of view of the spectator via the spectator worn personal AV apparatus 433. In this case, the personal AV apparatus 433 may include, in addition to a support frame, a personal AV system 434 as well as a display including a main region 435 and a peripheral display 436. In one or more implementations, the main region 435 may be transparent, with the spectator viewing the primary audio visual content on the main display 431, and the peripheral field of view AV content on the peripheral display 436 of the personal AV apparatus 433. AV control system 432 and personal AV system 434 may be in wireless communication so as to stream the secondary AV feed(s) to the apparatus and make any adjustments necessary to, for instance, scale the audio visual content in peripheral display 436 to that of main display 431.

Alternatively, remote spectator 440 in this example is shown to use only a personal AV apparatus 443 that is spectator worn to view the selected AV feed. The personal AV apparatus 443 includes a personal AV system 444 which may receive the selected set of AV feeds wirelessly from across communications network 420 (either directly or via a communications system located proximal to the remote spectator 440) and displays the primary AV feed in a primary display 445 and the secondary AV feed(s) in a peripheral display 446 of the personal AV apparatus 443. Note that the two remote spectators 430, 440 of FIG. 4 are provided by way of example only. Other implementations of immersing the remote spectators within the location of the actual spectators are covered by the inventive aspects described herein. Further, note that there may be hundreds, thousands, or even more, remote spectators viewing an event broadcasted or recorded as described herein.

Figure 5:
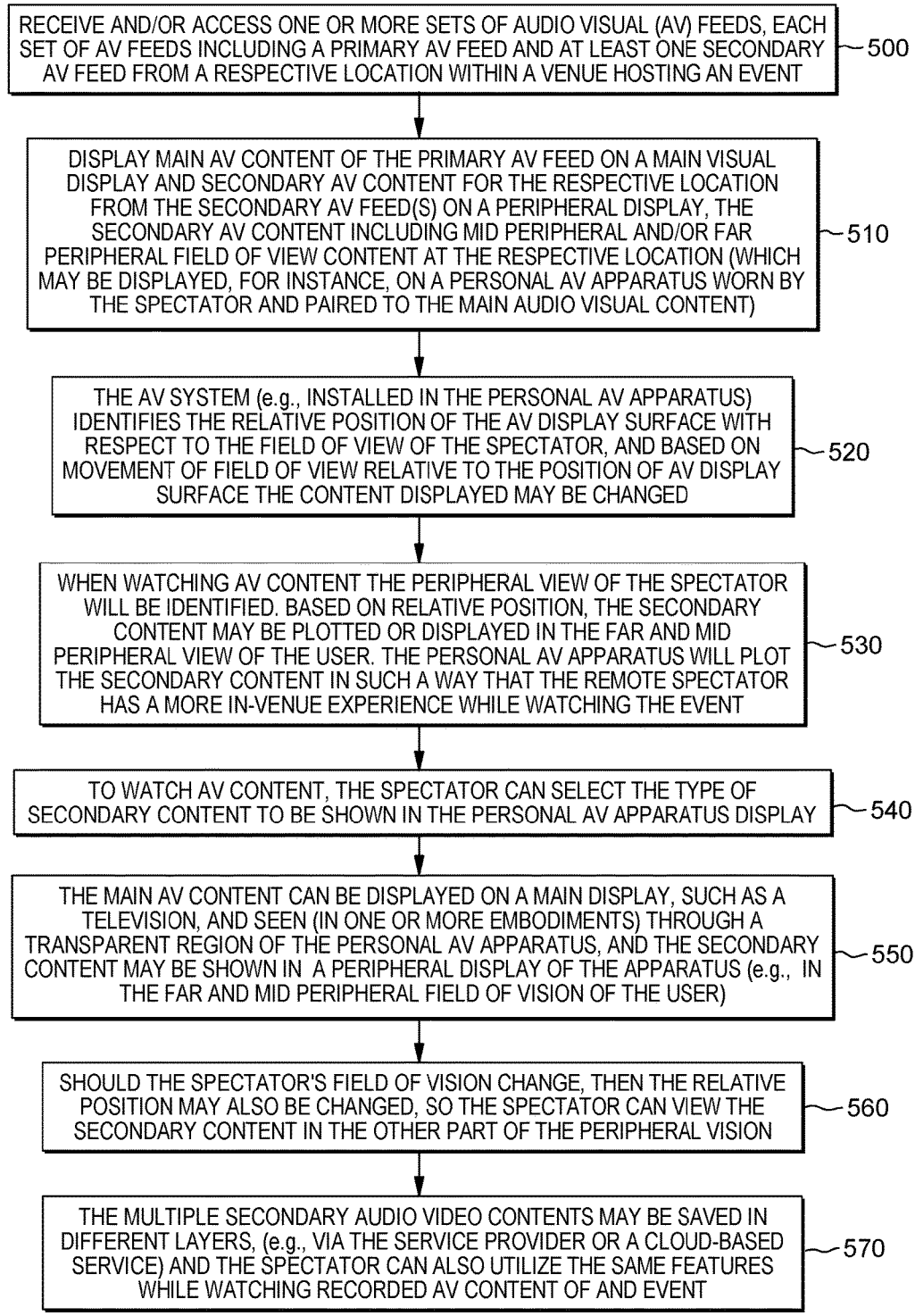
FIG. 5 depicts a further embodiment of a method of facilitating an in-venue experience for a remote spectator, in accordance with one or more aspects of the present invention

FIG. 5 depicts a further embodiment of a method of facilitating an in-venue experience for a remote spectator, in accordance with one or more aspects of the present invention. In this implementation, one or more sets of audio visual (AV) feeds are received (e.g., either by a remote spectator, or into storage such as at a cloud-based service), with each AV set including a primary AV feed and at least one secondary AV feed from a respective location within a venue hosting an event 500. The main audio visual content in a selected set of AV feeds is displayed on a main visual display of the remote spectator, and secondary audio visual content from the respective venue location is displayed on a peripheral display for viewing by the spectator in the spectator's peripheral field of view 510. As discussed, the secondary AV feed (or content) may include mid-peripheral and/or far-peripheral field of view content from the respective location within the venue and, in one or more embodiments, this information may be displayed on a personal AV apparatus worn by the spectator and paired to the main audio visual content. The personal AV apparatus may include a personal AV system which may identify the relative position of the AV display surface with respect to the field of view of the spectator wearing the apparatus, and based on movement of the field of view, the relative position of the AV display surface may also be changed 520. When watching AV content, the peripheral view of the spectator will be identified, and based on position, software (e.g., of the personal AV system) may be used to plot the secondary content in the mid and far-peripheral view of the spectator. The display device may plot the secondary content in such a way that the spectator has a more realistic in-venue experience 530. While watching AV content, the spectator can select the type of secondary content to be shown in the peripheral display of the personal AV apparatus 540. The main AV content can be seen through, for instance, a transparent region of the personal AV apparatus (or as noted, within a main display of the personal AV apparatus), and the secondary content may be shown in the peripheral display of the personal AV apparatus. Should the spectator's field of vision change, the relative position of the displayed image may also be changed, so the spectator can better view the secondary content, for instance, in the other portions of the spectator's peripheral vision 560. In one or more implementations, multiple secondary audio visual feeds or streams may be saved in different layers of the selected set of AV feeds (such as via the service provider, or through or in association with a cloud-based service) for access by the remote spectator. The spectator can also utilize the same features while watching a previously recorded event from the venue 570.

Figure 6:
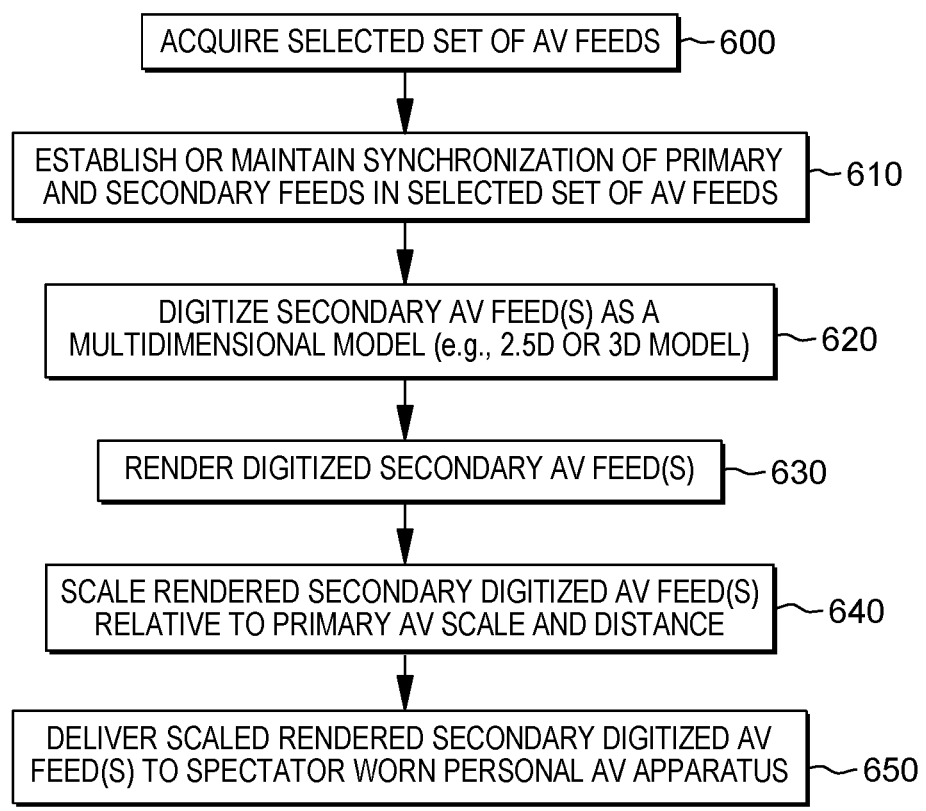
FIG. 6 depicts one embodiment of a process for rendering a digitized secondary AV feed(s) to facilitate manipulation of the displayed view of the secondary AV feed by the remote spectator, in accordance with one or more aspects of the present invention.

As noted briefly above, in one or more implementations, the secondary AV feed may be modeled so that a spectator can manipulate the peripheral view or scene, such as by turning their head and thus better see the audience at the respective location, as well as their modeled dynamic actions. The multidimensional digitized and rendered secondary AV model may be in one embodiment synchronous (i.e., dependent upon the primary AV feed), or in another embodiment, the primary and secondary (rendered) AV feeds or streams may be asynchronous (i.e., independent). As shown in FIG. 6, the process may include acquiring a selected set of AV feeds 600, and establishing or maintain synchronization of the primary and secondary feeds (of the selected set of AV feeds) 610. The secondary AV feed may be digitized as a multidimensional model (for instance, a 2.5D or 3D model) 620. The digitized secondary AV feed may be rendered 630, and scaled relative to the primary AV scale and distance 640. The scaled rendered secondary digitized AV feed(s) may be delivered to the spectator worn AV apparatus, such as to the personal AV system of the personal AV apparatus for display, for instance, in the peripheral display of the apparatus 650.

In one or more other implementations, the service provider or broadcaster of an event could employ panoramic AV camera systems among the spectators or audience at the venue, for instance, at a plurality of different locations. With AV feeds produced using such equipment, the remote spectator or user could pan the spectators within the venue at the designated location using the unmodified audio video feed provided by the service provider.

Figure 7:
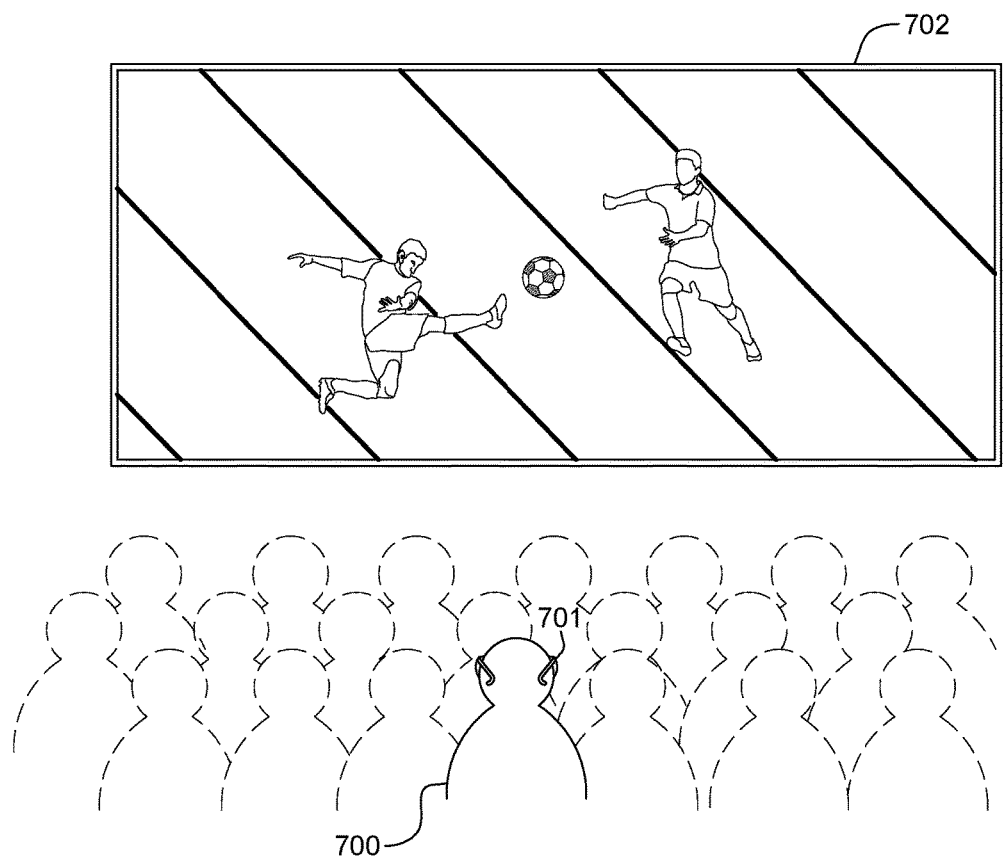
FIG. 7 depicts another embodiment of displaying primary AV content and secondary AV content, in accordance with one or more aspects of the present invention.

FIG. 7 is a representation of a spectator 700 wearing a personal AV apparatus, such as head mounted display, for viewing an event, such as a sporting event, on a main display 702 separate from the personal AV apparatus. As illustrated, spectator 700 perceives the actual people within the venue at the location where the event is occurring as recorded at the respective location from which the displayed set of AV feeds was captured. In this way, the remote spectator 700 experiences the event in a more life like, in-venue setting. As noted, a variety of approaches may be employed for displaying the secondary AV content of the actual spectator's in-venue at the location where the audio video content is captured. In the above-described embodiments, the spectator wears a personal AV apparatus, such as a head mounted display, to show the in-venue spectators at that location on a peripheral display of the apparatus. In another embodiment, a supplemental holographic apparatus could be used to depict the secondary AV content. In such an embodiment, a main display, such as a television or other standard computer display screen could be used in association with the personal AV apparatus worn by the spectator. The main display may have embedded, or as a peripheral component, an in-air holographic capability that delivers a hologram(s) at some volumetric region near the spectator worn personal AV apparatus. For instance, the hologram(s) may be delivered in close proximity to the personal AV apparatus worn by the spectator. Further, the personal AV apparatus may have a camera means to observe the projected hologram(s) and render the hologram digitally within the field of view of the personal AV apparatus, and in particular, within the peripheral display or peripheral field of view of the remote spectator. The personal AV apparatus equipped with this capability will scale and adjust the hologram rendering according to the scale and relative distances between the remote spectator and the main display and the peripheral scene.

Further exemplary embodiments of a computing environment to implement one or more aspects of the present invention are described below with reference to FIGS. 8-10.

Figure 8:
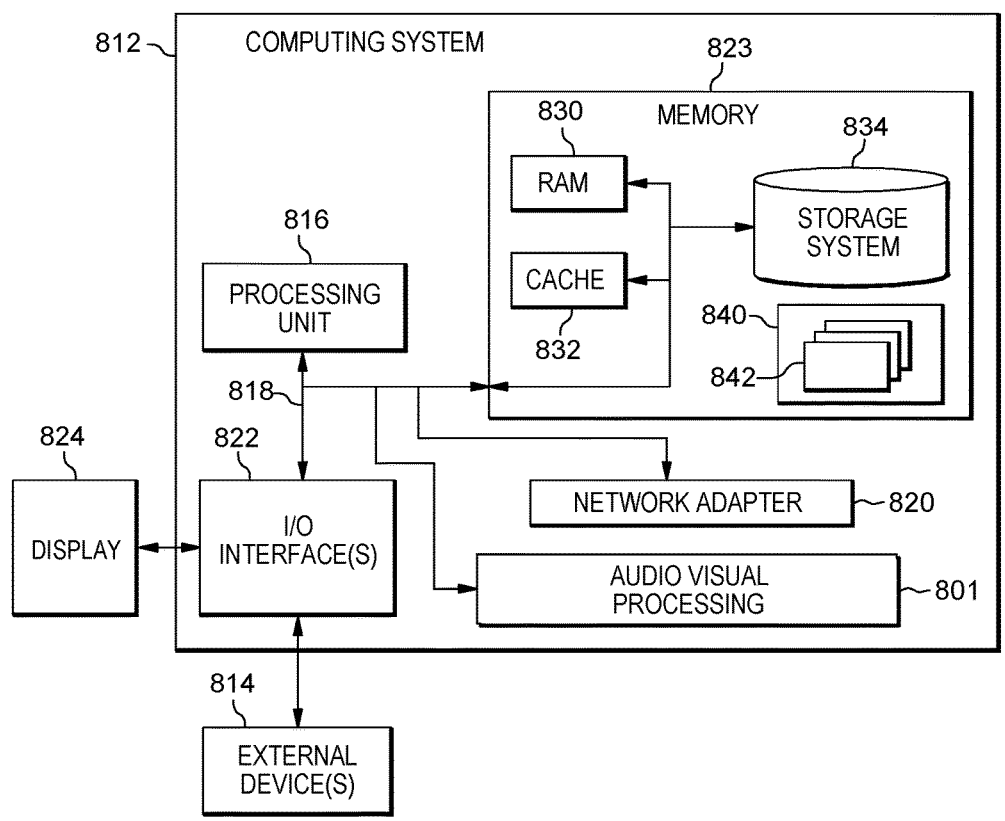
FIG. 8 depicts one embodiment of a computing system which may implement or facilitate implementing in-venue experience processing, in accordance with one or more aspects of the present invention.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 812 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 8, computing system 812, is shown in the form of a general-purpose computing device. The components of computing system 812 may include, but are not limited to, one or more processors or processing units 816, a system memory 823, and a bus 818 that couples various system components including system memory 823 to processor 816.

In one embodiment, processor 816 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 may include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 may include at least one program product having a set (e.g., at least one) of program modules that are configured to carry out the functions of embodiments of the invention.

Program/utility 840, having a set (at least one) of program modules 842, may be stored in memory 832 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Alternatively, an audio visual processing module, logic, etc., 801 may be provided within computing environment 812.

Computing system 812 may also communicate with one or more external devices 814 such as a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 8. Computer system/server 812 of FIG. 8 may be practiced in distributed cloud computing environments where tasks are performed by remote processing devices that are linked through a communications network. In a distributed cloud computing environment, program modules may be located in both local and remote computer system storage media including memory storage devices. Computer system/server 812 is capable of being implemented and/or performing any of the functionality set forth hereinabove.

Figure 9:
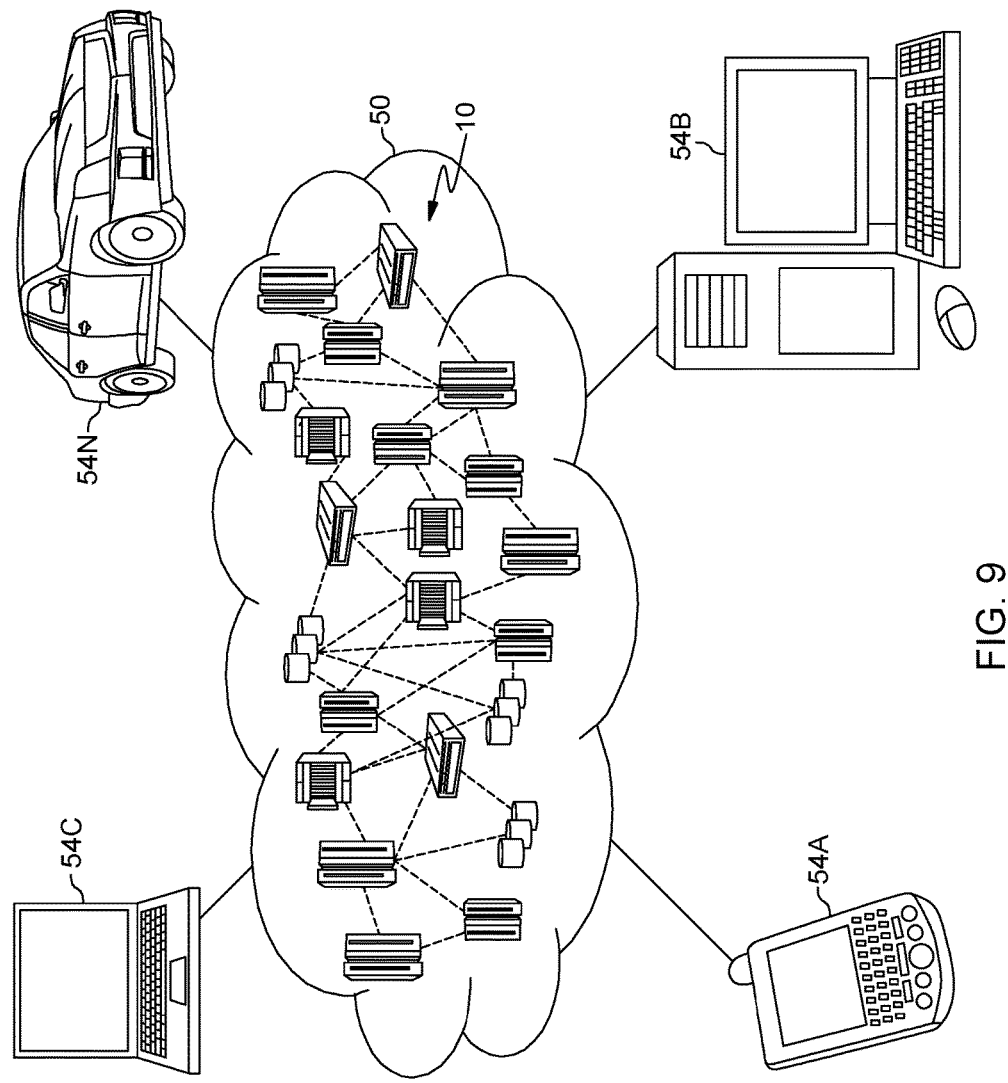
FIG. 9 depicts one embodiment of a cloud computing environment which may facilitate implementing, or be used in association with, one or more aspects of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
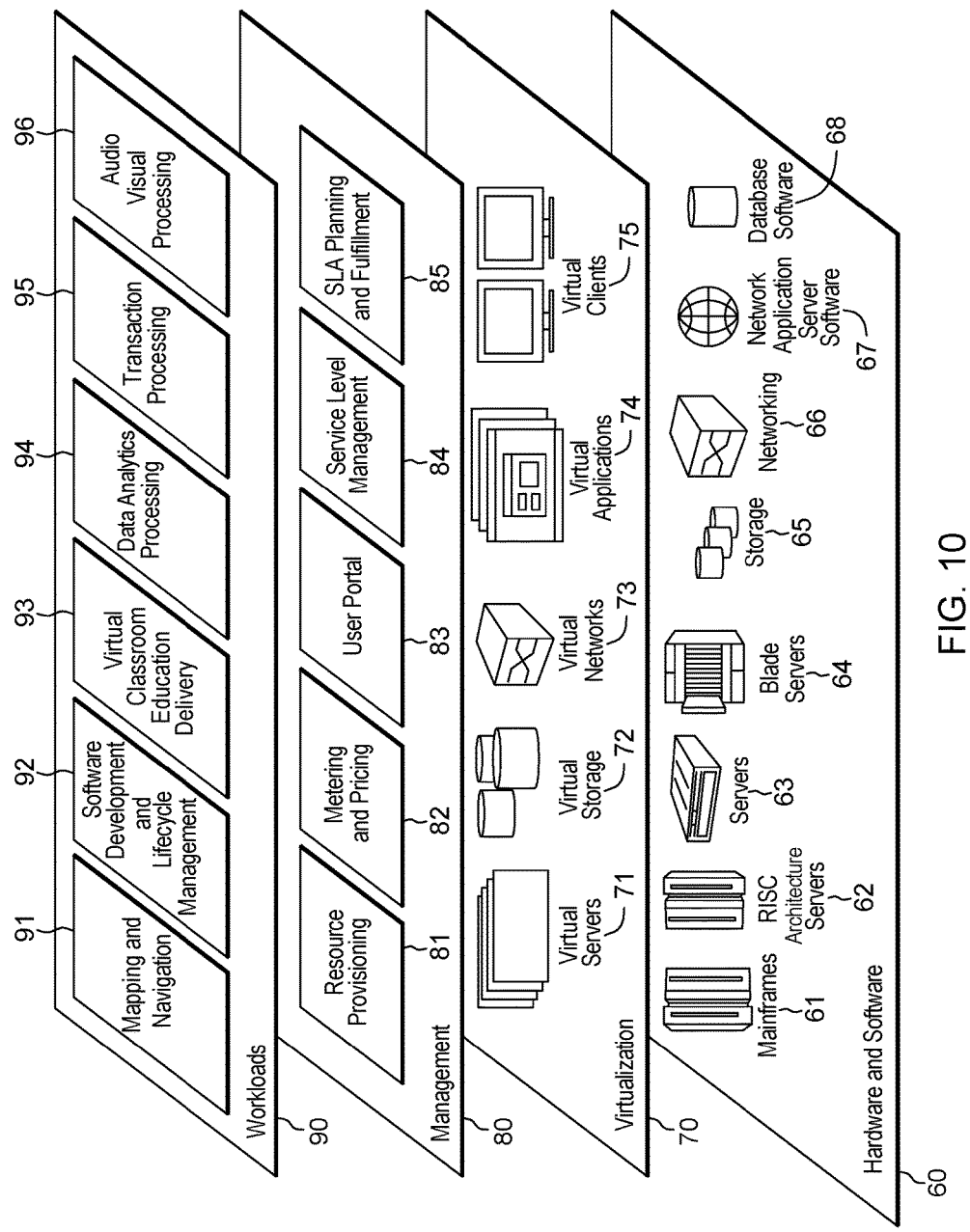
FIG. 10 depicts an example of extraction model layers, which may facilitate implementing audio visual processing, in accordance with one or more aspects of the present invention.

Referring to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio visual processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system for facilitating a virtual in-venue experience for a remote spectator of an event, the system comprising:
   a memory; and
   a processor communicatively coupled to the memory, wherein the system performs a method comprising:
      receiving one or more sets of audio visual feeds of the event, a set of audio visual feeds of the one or more sets of audio visual feeds comprising a primary audio visual feed and one or more secondary audio visual feeds, the primary audio visual feed of the set comprising main audio visual content of the event for that set and the at least one secondary audio visual feed(s) comprising secondary audio visual content of the event, supplemental to the main audio visual content for that set, and comprising peripheral field of view audio visual content for the set from a respective location within a venue hosting the event, each set of audio visual feeds being captured, at least in part, from a different respective location within the venue hosting the event;
      displaying the primary audio visual feed of the set of audio visual feeds for viewing by a remote spectator and also displaying in association therewith, at least in part, the secondary audio visual feed(s) of the set in a peripheral field of view of the remote spectator, wherein the secondary audio visual feed(s) provides the remote spectator with peripheral audio visual content at the respective location supplemental to the main audio visual content, thereby facilitating the in-venue experience for the remote spectator;
      digitizing the secondary audio visual feed(s) of the set to produce a multi-dimension model comprising a digitized secondary audio visual feed(s);
      rendering the digitized secondary audio visual feed(s) to produce a rendered, digitized secondary audio visual feed(s);
      scaling the rendered, digitized secondary audio visual feed(s) relative to a scale and distance of the primary audio visual feed in the set; and
      wherein the displaying comprises displaying the scaled, rendered, digitized secondary audio visual feed(s) for the remote spectator in, at least in part, the peripheral field of view of the remote spectator.

2. The system of claim 1, wherein the receiving comprises receiving multiple sets of audio visual feeds each generated from a respective location within the venue, and the method further comprises selecting, by the remote spectator, the set of audio visual feeds from the multiple sets of audio visual feeds for display.

3. The system of claim 1, wherein the set of audio visual feeds comprises multiple secondary audio visual feeds, and the method further comprises selecting, by the remote spectator, a secondary audio visual feed of the multiple secondary audio visual feeds for display in the peripheral field of view of the remote spectator.

4. The system of claim 1, wherein the displaying comprises displaying the primary audio visual feed of the set on a main display and displaying, at least in part, the secondary audio visual feed(s) of the set on a peripheral display of a personal audio visual apparatus worn by the remote spectator.

5. The system of claim 4, wherein the main display is separate from the personal audio visual apparatus worn by the remote spectator, and comprises a television screen or a computer display screen.

6. The system of claim 4, wherein the personal audio visual apparatus worn by the user comprises the main display, in addition to the peripheral display.

7. The system of claim 1, further comprising displaying, responsive to remote spectator control, the scaled, rendered, digitized secondary audio visual feed(s) on a main display in a macular field of view of the remote spectator.

8. A computer program product for facilitating providing a virtual in-venue experience for a remote spectator of an event, the computer program product comprising:
   a computer readable storage medium having computer readable program code embodied therewith, the computer readable program code being executable by a processor to perform a method comprising:
      receiving one or more sets of audio visual feeds of the event, a set of audio visual feeds of the one or more sets of audio visual feeds comprising a primary audio visual feed and one or more secondary audio visual feeds, the primary audio visual feed of the set comprising main audio visual content of the event for that set and the at least one secondary audio visual feed(s) comprising secondary audio visual content of the event, supplemental to the main audio visual content for that set, and comprising peripheral field of view audio visual content for the set from a respective location within a venue hosting the event, each set of audio visual feeds being captured, at least in part, from a different respective location within the venue hosting the event;
      displaying the primary audio visual feed of the set of audio visual feeds for viewing by a remote spectator and also displaying in association therewith, at least in part, the secondary audio visual feed(s) of the set in a peripheral field of view of the remote spectator, wherein the secondary audio visual feed(s) provides the remote spectator with peripheral audio visual content at the respective location supplemental to the main audio visual content, thereby facilitating the in-venue experience for the remote spectator;
      digitizing the secondary audio visual feed(s) of the set to produce a multi-dimension model comprising a digitized secondary audio visual feed(s);
      rendering the digitized secondary audio visual feed(s) to produce a rendered, digitized secondary audio visual feed(s);

scaling the rendered, digitized secondary audio visual feed(s) relative to a scale and distance of the primary audio visual feed in the set; and wherein the displaying comprises displaying the scaled, rendered, digitized secondary audio visual feed(s) for the remote spectator in, at least in part, the peripheral field of view of the remote spectator.

9. The computer program product of claim 8, wherein the receiving comprises receiving multiple sets of audio visual feeds each generated from a respective location within the venue, and the method further comprises receiving a selection, from the remote spectator, of the set of audio visual feeds from the multiple sets of audio visual feeds for display.

10. The computer program product of claim 8, wherein the set of audio visual feeds comprises multiple secondary audio visual feeds, and the method further comprises receiving a selection, from the remote spectator, of a secondary audio visual feed of the multiple secondary audio visual feeds for display in the peripheral field of view of the remote spectator.

11. The computer program product of claim 8, wherein the displaying comprises displaying the primary audio visual feed of the set on a main display and displaying, at least in part, the secondary audio visual feed(s) of the set on a peripheral display of a personal audio visual apparatus worn by the remote spectator.

12. The computer program product of claim 11, wherein the main display is separate from the personal audio visual apparatus worn by the remote spectator, and comprises a television screen or a computer display screen.

13. The computer program product of claim 11, wherein the personal audio visual apparatus worn by the user comprises the main display, in addition to the peripheral display.

14. The computer program product of claim 8, wherein the method further comprises displaying, responsive to remote spectator control, the scaled, rendered, digitized secondary audio visual feed(s) on a main display in a macular field of view of the remote spectator.

* * * * *